United States Patent

Inoue et al.

Patent Number: 5,963,512
Date of Patent: Oct. 5, 1999

[54] RECORDING/REPRODUCING METHOD OF MAGNETO-OPTICAL RECORDING MEDIUM AND DRIVE SYSTEM FOR MAGNETO-OPTICAL RECORDING MEDIUM

[75] Inventors: Hiroyasu Inoue; Shinji Miyazaki; Jiro Yoshinari, all of Nagano, Japan

[73] Assignee: TDK Corporation, Tokyo, Japan

[21] Appl. No.: 09/093,096

[22] Filed: Jun. 8, 1998

[30] Foreign Application Priority Data

Jun. 6, 1997 [JP] Japan ................................. 9-164994

[51] Int. Cl.$^6$ .................................................. G11B 11/00
[52] U.S. Cl. .............................................. 369/13; 369/110
[58] Field of Search ................................. 369/13, 14, 110, 369/116; 360/59, 114; 365/122

[56] References Cited

U.S. PATENT DOCUMENTS

| | | | |
|---|---|---|---|
| 5,247,495 | 9/1993 | Birukawa et al. | 369/13 |
| 5,420,728 | 5/1995 | Kawase | 360/59 |
| 5,706,259 | 1/1998 | Fukamachi et al. | 369/13 |
| 5,754,500 | 5/1998 | Tanaka et al. | 369/13 |
| 5,790,513 | 8/1998 | Hiroki et al. | 369/275.2 |
| 5,862,105 | 1/1999 | Nishimura | 369/13 |
| 5,864,520 | 1/1999 | Fukamachi et al. | 369/13 |
| 5,879,822 | 3/1999 | Okada | 369/13 |

*Primary Examiner*—Tan Dinh
*Attorney, Agent, or Firm*—Laubscher & Laubscher; R. J. Lasker

[57] ABSTRACT

In the present invention, data transmission rate is increased in the recording of the magneto-optical recording media in which the reproduction is accomplished by applying a modulated magnetic field in a scheme of "copying of the recorded magnetic domain→enlargement of the copied magnetic domain→reproduction of the copied magnetic domain →size reduction and disappearance of the copied magnetic domain". The recording/reproducing method of the present invention is adapted for use with a magneto-optical recording medium having a magnetic lamination comprising a recording layer and an amplification layer wherein recording is accomplished by applying a modulated recording magnetic field, and reproduction is accomplished by applying 1 cycle of the modulated magnetic field (reproduction magnetic field+erase magnetic field) per 1 record mark (1 bit). In the recording/reproducing method of the present invention, the recording and the reproduction are conducted such that:

$$V_R/V_P > 1$$

when $V_R$ is linear velocity of the magneto-optical recording medium in relation to said recording magnetic field, and $V_P$ is linear velocity of the magneto-optical recording medium in relation to modulated magnetic field.

2 Claims, 2 Drawing Sheets

COPYING

DISAPPEARANCE

AS RECORDED STATE

INITIALIZATION

COPYING

ENLARGEMENT

SHRINKAGE

DISAPPEARANCE

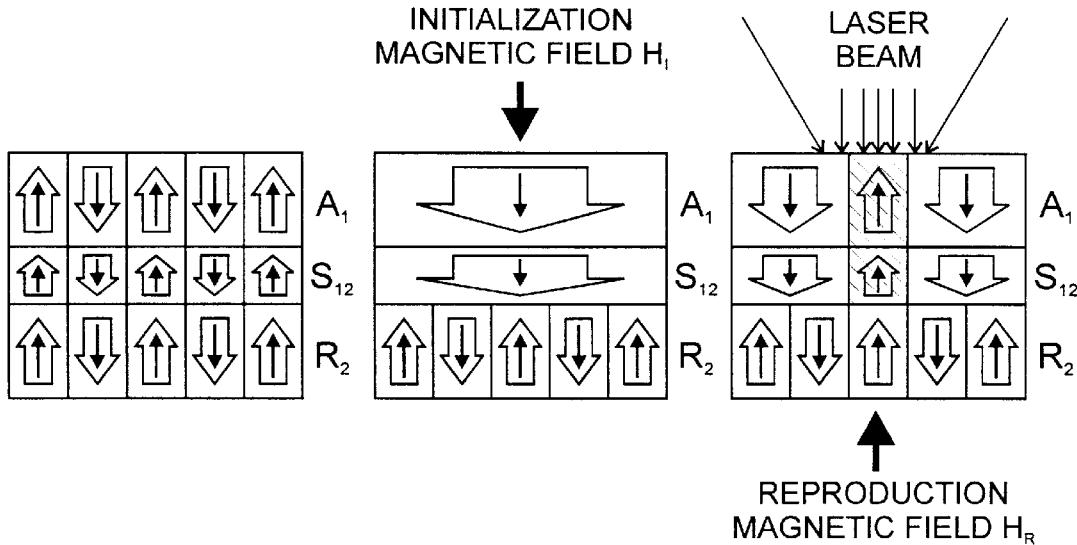
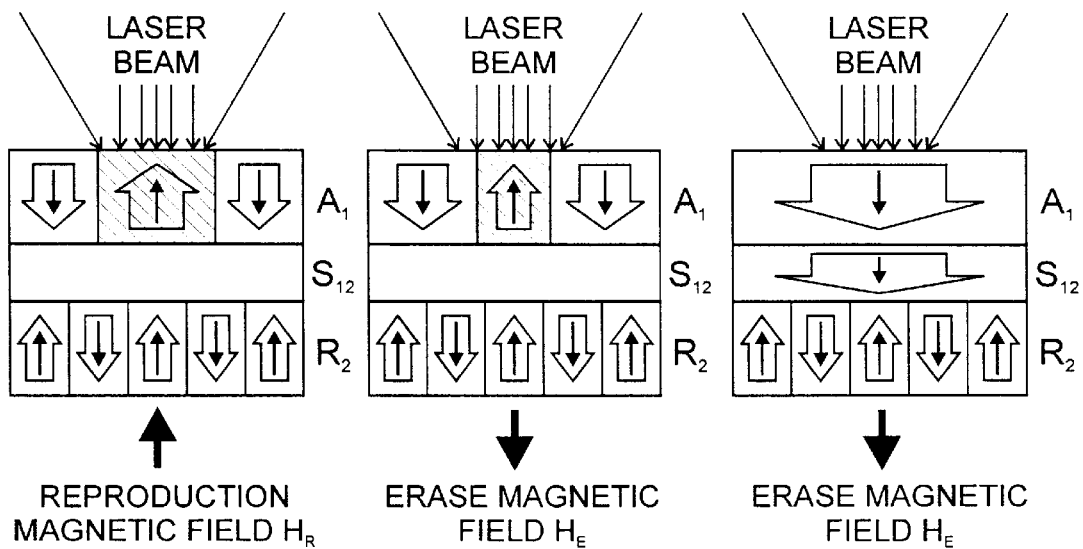

RECORDING/REPRODUCING METHOD OF MAGNETO-OPTICAL RECORDING MEDIUM AND DRIVE SYSTEM FOR MAGNETO-OPTICAL RECORDING MEDIUM

BACKGROUND OF THE INVENTION

1. Field of the Invention

This invention relates to a recording/reproducing method of a magneto-optical recording medium, and a magneto-optical recording medium drive system utilizing such recording/reproducing method.

2. Prior Art

A magneto-optical recording medium is a recording medium wherein local heating of the magnetic thin film is achieved by means of a laser beam or the like to reduce coercive force, and wherein the direction of magnetization in this part is reversed with external magnetic field, or alternatively, the magnetization direction of initialization is maintained to thereby form a magnetic domain (record mark), and wherein the magnetization direction of the magnetic domain is read out by utilizing Kerr effect or Faraday effect.

In conventional magneto-optical recording media, density of the reproducible magnetic domains has been limited by the diameter of the laser beam spot used for the reproduction, and the magnetic domains of a diameter less than half of the laser beam spot diameter has been hardly reproducible.

Japanese Patent Application Kokai No. (JP-A) 8-7350 discloses an exemplary magneto-optical recording medium wherein reproduction of the magnetic domain with a diameter less than half of the laser beam spot diameter has been enabled. This magneto-optical recording medium has a recording film of triple magnetic layers, namely, first, second and third magnetic layers disposed on the substrate in this order, and the three magnetic layers are exchange-coupled. In the reproduction, the medium is irradiated with a laser beam from the side of the substrate, and reproduction magnetic field is applied from the side of the recording film. The recorded magnetic domain is retained in the third magnetic layer, and the magnetic domain is copied to the first and the second magnetic layers by laser beam irradiation. The thus copied magnetic domains enlarge in in-plane directions of the magnetic layers upon application of the read magnetic field. The copied, enlarged magnetic domain is read out as in the case of conventional magneto-optical recording media. When the reproduction of the copied, enlarged magnetic domain is completed, the copied magnetic domain is erased by applying erase magnetic field whose direction is opposite to the read magnetic field. By repeating such procedure, small magnetic domains which had been unreproducible could be reproduced. The merit of this process is not only the high reproduction resolution. Since the magnetic domains are actually enlarged, real amplification of the reproduced signal intensity is enabled. The magneto-optical recording medium of this type is hereinafter referred to as a magneto-optical recording medium of magnetic amplifying magneto-optical system (MAMMOS).

In this reproduction system, a modulated magnetic field comprising the reproduction magnetic field and the erase magnetic field should be applied in accordance with the density of the recorded magnetic domain. More illustratively, 1 cycle of the modulated magnetic field should be applied per 1 recorded magnetic domain (1 bit) for reproduction. In the recording in a magnetic field modulation mode, the recorded magnetic domain is formed by reversal in the direction of the recording magnetic field, and a modulated magnetic field (recording magnetic field) of 0.5 cycle at maximum is applied per 1 recorded magnetic domain (1 bit). As a consequence, in the medium of magnetic amplifying magneto-optical system which had been recorded in the magnetic field modulation mode, the frequency of the modulated magnetic field applied in the reproduction had to be twice the maximum frequency of the recording magnetic field. For example, in the example of the JP-A 8-7350, supra, the magnetic domain recorded at a disc linear velocity of 2.1 m/s and a modulation frequency of 2.5 MHz is reproduced by means of a magnetic field modulated at 5 MHz.

There is, however, a limit in terms of technology and cost in increasing the frequency of the magnetic field generating means, and the frequency of the modulated magnetic field used in the reproduction is determined by this limit. Therefore, the maximum frequency of the recording magnetic field is limited to ½ of the frequency limit of the magnetic field generating means, and increase in the data transmission rate upon recording is difficult in the medium of the magnetic amplifying magneto-optical system.

SUMMARY OF THE INVENTION

An object of the present invention is to increase data transmission rate upon recording of the magneto-optical recording media having a magnetic layer of multi-layer constitution in which the reproduction is accomplished by a scheme: copying of the recorded magnetic domain→enlargement of the copied magnetic domain→reproduction of the copied magnetic domain→size reduction and disappearance of the copied magnetic domain.

The object as described above is accomplished by any of (1) to (3) as described below.

(1) A recording/reproducing method for a magneto-optical recording medium having a magnetic lamination comprising a recording layer and an amplification layer, wherein upon recording, the recording medium is irradiated with a laser beam of constant intensity to apply a modulated recording magnetic field to the recording layer to thereby form recorded magnetic domain in the recording layer; and upon reproduction, the recording medium is first irradiated with a laser beam simultaneously with application of a modulated reproduction magnetic field to copy the recorded magnetic domain to the amplification layer to thereby form copied magnetic domain and enlarge the thus formed copied magnetic domain, and the copied magnetic domain is then read out, and an erase magnetic field of the direction opposite to said reproduction magnetic field is subsequently applied to the copied magnetic domain to thereby promote shrinkage and disappearance of said copied magnetic domain; and the recording and the reproduction are conducted such that:

$V_R/V_P > 1$ wherein $V_R$ is linear velocity of the magneto-optical recording medium in relation to said recording magnetic field, and $V_P$ is linear velocity of the magneto-optical recording medium in relation to modulated magnetic field comprising said reproduction magnetic field and erase magnetic field.

(2) A recording/reproducing method of a magneto-optical recording medium of the above (1) wherein the recording and the reproduction are conducted such that:

$$V_R/V_P \leq 2$$

(3) A drive system of a magneto-optical recording medium wherein the recording and the reproduction are conducted by the method of the above (1) or (2).

The magneto-optical recording medium of the magnetic amplifying magneto-optical system suffered from the problem that when it is recorded in a magnetic field modulation mode, the frequency of the modulated magnetic field applied in the reproduction should be twice the maximum frequency of the recording magnetic field, and the data transmission rate in the recording could be increased only to a limited level due to the technical and cost limit in increasing the frequency of the magnetic field generating means.

In contrast, in the present invention, increase in the maximum frequency of the recording magnetic field to the level in excess of ½ of the frequency of the modulated magnetic field in the reproduction has been enabled by using a higher linear velocity of the medium for the recording compared to the linear velocity used in the reproduction. Increase in the data transmission rate in the recording is thereby enabled. For example, when the recording is conducted at a linear velocity twice higher than the that of the reproduction, the maximum frequency of the recording magnetic field can be increased to the level the same as the frequency of the modulated magnetic field in the reproduction, and the data transmission rate in the recording can be increased to twice the conventional rate. Such use of the same frequency for the maximum frequency of the recording magnetic field and the reproduction magnetic field enables cost reduction of the drive system.

BRIEF DESCRIPTION OF THE DRAWINGS

FIGS. 2A to 2F schematically illustrate the reproduction process of the magneto-optical recording medium according to the recording/reproducing method of the present invention.

PREFERRED EMBODIMENTS OF THE INVENTION

Recording/Reproducing Method

Figure 1A:
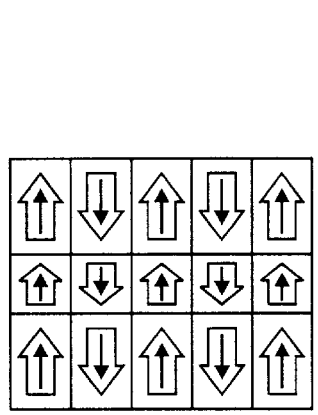
FIGS. 1A to 1F schematically illustrate the reproduction process of the magneto-optical recording medium according to the recording/reproducing method of the present invention.

In the record reproducing method of the present invention, a magneto-optical recording medium having a magnetic lamination comprising a recording layer and an amplification layer is used.

The recording of the magneto-optical recording medium is carried out in magnetic field modulation mode. Upon recording in the magnetic field modulation mode, a modulated magnetic field is applied to the recording layer by irradiating the recording layer with a laser beam of a constant intensity to form recorded magnetic domains.

On the other hand, in the reproduction, the medium is irradiated with a laser beam simultaneously with application of a reproduction magnetic field to copy the recorded magnetic domain to the amplification layer to form a copied magnetic domain and to enlarge the copied magnetic domain. The copied magnetic domain is then read out by utilizing Kerr effect or Faraday effect. An erase magnetic field of the direction opposite to the reproduction magnetic field is subsequently applied to promote shrinkage and disappearance of the copied magnetic domain. In other words, in the reproduction, a modulated magnetic field comprising the reproduction magnetic field and the erase magnetic field is applied to the medium.

The recording and the reproduction are conducted such that:

$$V_R/V_P > 1$$

wherein $V_R$ is linear velocity of the magneto-optical recording medium in relation to said recording magnetic field, and $V_P$ is linear velocity of the magneto-optical recording medium in relation to said modulated magnetic field applied in the reproduction. The recording and the reproduction are preferably conducted such that:

$$V_R/V_P \geq 1.1$$

As described above, in the reproduction, 1 cycle of modulated magnetic field should be applied per 1 recorded magnetic domain, and upon recording in the magnetic field modulation mode, application of 0.5 cycle at the maximum of the recording magnetic field is required per 1 recorded magnetic domain. Therefore, when the recording is conducted at a linear velocity higher than the that of the reproduction, the maximum frequency of the recording magnetic field can be increased to a level in excess of ½ of the frequency of the modulated magnetic field used in the reproduction.

There is no particular limitation for the $V_R/V_P$. It is, however, preferable that $V_R/V_P$ is in such range:

$$V_R/V_P \leq 2$$

When $V_R/V_P=2$, the maximum frequency of the recording magnetic field will be equal to the frequency of the modulated magnetic field used in the reproduction. When $V_R/V_P$ is in excess of 2, the maximum frequency of the recording magnetic field will be higher than the frequency of the modulated magnetic field in the reproduction. In such a case, the maximum frequency of the recording magnetic field will confront the technological and cost limits of the magnetic field generating means, and the frequency of the modulated magnetic field in the reproduction will be lower than the limit of the magnetic field generating means to invite decrease in recording density and data transmission rate in the reproduction.

Macneto-Optical Recording Medium

The present invention is adapted for use with a magneto-optical recording medium of the constitution as described in JP-A 8-7350. The present invention is also adapted for use with a magneto-optical recording medium proposed in Japanese Patent Application No. 9-108089, which is an application of the inventors of the present invention.

In JP-A 8-7350, supra, the second magnetic layer comprises a rare earth metal-transition metal alloy having a compensation temperature higher than room temperature, and Curie temperature of the second magnetic layer is lower than the recording temperature of the minute magnetic domain. The third magnetic layer comprises a rare earth metal-transition metal alloy, and at room temperature, the magnetic moment as a whole is in the same direction as the magnetic moment of the rare earth metal. The inventors of the present invention, however, have found that the improvement in the intensity of the reproduced signal is only insufficiently improved by the recording medium of the recording film constitution as described in the JP-A 8-7350 because of excessively strong exchange coupling force between the magnetic layers which inhibits smooth enlargement of the copied magnetic domain. In addition, JP-A 8-7350 requires fabrication of the second magnetic layer from a rare earth metal-transition metal alloy having a compensation temperature higher than room temperature. The compensation temperature, however, greatly fluctuates by slight difference in the composition, and it is extremely difficult to adjust the compensation temperature to a particular temperature range above the room temperature.

In view of such situation, the inventors of the present invention proposed in Japanese Patent Application No. 9-108089 means for obviating the insufficiency of the JP-A 8-7350. In one of such means wherein an exchange coupling control layer or a switching layer of particular properties is provided, need for providing the magnetic layer having a compensation temperature higher than room temperature has been eliminated to facilitate the designing of the magnetic layer composition and formation of the layer. This patent application also disclosed that, although the intensity of the signal reproduced is rather low, the reproduction can be accomplished through copying and enlargement of the recorded magnetic domain even if none of the exchange coupling control layer, the switching layer, and the magnetic layer having a compensation temperature higher than room temperature were formed. The constitutions of the magneto-optical recording media disclosed in this patent application are hereinafter described in detail.

The invention described in this patent application comprises constitutions I, II, and III as described below. Next, the constitutions I, II, and III are described by referring to their embodiments.

Constitution I

The magneto-optical recording medium of Constitution I has a magnetic laminate on the front side of the medium, and this magnetic laminate comprises at least three layers, namely, an amplification layer $A_1$, an exchange coupling control layer $C_{12}$, and a recording layer $R_2$ in this order. The recording layer $R_2$ is the layer where magnetic domains are formed by the magneto-optical recording. In the reproduction of the magneto-optical recording medium wherein recorded magnetic domain has been formed, an initialization magnetic field in the direction perpendicular to the magnetic laminate is first applied. Next, the medium is irradiated with a laser beam to sequentially copy the magnetic domains formed in the recording layer $R_2$ to the amplification layer $A_1$ through the exchange coupling control layer $C_{12}$ to form copied magnetic domains. Simultaneously with the copying of the recorded magnetic domain, a reproduction magnetic field is applied to the medium to enlarge the copied magnetic domain. The direction of the reproduction magnetic field is opposite to the initialization magnetic field. The thus enlarged copied magnetic domain in the amplification layer $A_1$ is read out. Next, the copied magnetic domain in the amplification layer $A_1$ whose reproduction has been completed is allowed to shrink and disappear by applying an erase magnetic field whose magnetization direction is opposite to the reproduction magnetic field. The magnetic domain adjacent to the magnetic domain whose reproduction has been just completed is subsequently reproduced.

Reproducing step (Constitution I)

The case of the magnetic domain whose magnetizing direction is the same as the reproduction magnetic field FIGS. 1A to 1F are schematic views showing the magnetizing direction of the magnetic layers of the magnetic laminate. The blank arrows indicate the direction of the magnetization direction of the magnetic layer as a whole, and the black arrows indicate the spin direction of the transition metal element in the magnetic layer. Such figure legends are common to other drawings. The amplification layer $A_1$ of the present invention has either no compensation temperature or a compensation temperature which is lower than room temperature, and therefore, the magnetization direction is consistent with the spin direction. It should be noted that the recording layer $R_2$ may have a compensation temperature which is higher than the room temperature.

First, of the magnetic domains recorded in the recording layer $R_2$, reproduction of the magnetic domain having the magnetization direction which is the same as the magnetization direction of the reproduction magnetic field, that is, reproduction of the magnetic domain having the magnetization direction in the upward direction in FIGS. 1A to 1F are explained.

FIG. 1A: As-recorded state

As shown in FIG. 1A, magnetic domains are formed in the recording layer $R_2$ by the magneto-optical recording. The domains which has the same spin direction as the recording layer $R_2$ are formed in the amplification layer $A_1$ by the interface wall exchange coupling force. It should be noted that the composition and the thickness of the exchange coupling control layer $C_{12}$ are adjusted so that the layer $C_{12}$ may function as a domain wall.

Figure 1B:
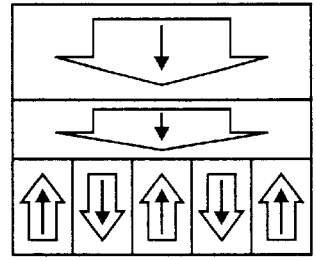

FIG. 1B: Initialization

To the magneto-optical recording medium of the conditions as described above, was applied the initialization magnetic field $H_I$ as shown in FIG. 1B. The initialization magnetic field is applied by an initialization magnetic head. The initialization magnetic head is arranged at a position distant from the reproducing magnetic head as described below. By the application of the initialization magnetic field $H_I$, the magnetization direction of the amplification layer $A_1$ and the exchange coupling control layer will be the same as the initialization magnetic field.

Figure 1C:
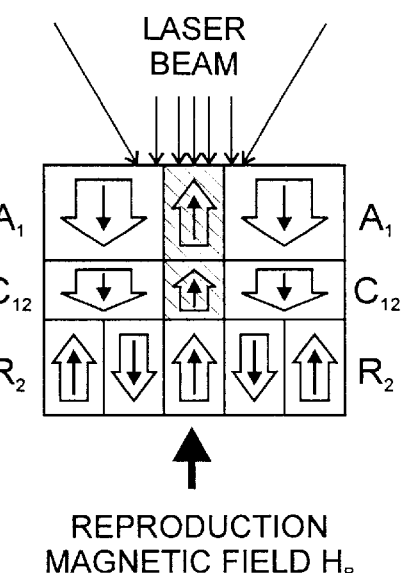

FIG. 1C: Copying of the magnetic domain

After the application of the initialization magnetic field, the medium is irradiated with a laser beam simultaneously with the application of the reproduction magnetic field $H_R$. The reproduction magnetic head used for applying the reproduction magnetic field $H_R$ and the optical pick up used for irradiating the laser beam are generally arranged on opposite sides of the medium, and the laser beam is irradiated from the side of the substrate. The reproducing magnetic field $H_R$ is of the direction opposite to the initialization magnetic field $H_I$.

Temperature of the magnetic layers is elevated by the irradiation of the laser beam, and the interface wall exchange coupling force between the adjacent magnetic layers is increased. The recorded magnetic domain of the recording layer $R_2$ is thereby copied to the amplification layer $A_1$ to form a copied magnetic domain. The magnetization direction of the copied magnetic domain formed in the amplification layer $A_1$ is opposite to the direction of the initialization magnetization direction.

Figure 1D:
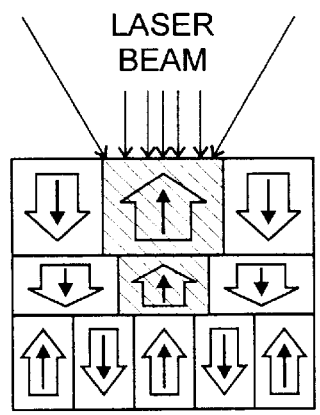

FIG. 1D: Enlargement of copied magnetic domain

Since the reproducing magnetic field $H_R$ of the direction the same as the magnetization direction of the magnetic layer is applied to each of the magnetic layers, the magnetic domains of the magnetic layers attempt to enlarge in the in-plane direction. In this occasion, the enlargement of the magnetic domain in the recording layer $R_2$ is avoided while the enlargement of the magnetic domain in the amplification layer $A_1$ is promoted. For this purpose, the recording layer $R_2$ is adjusted, for example, such that the coercive force of high level is retained at the temperature of the laser beam irradiation to thereby avoid the enlargement of the magnetic domain. On the other hand, the amplification layer $A_1$ is adjusted, for example, such that the interface wall exchange coupling force between the amplification layer $A_1$ and the recording layer $R_2$ is weak enough to overcome the magnetic field of Bloch wall exchange coupling force and the coercive force to enable the enlargement of the magnetic domain.

After such enlargement of the copied domain in the amplification layer $A_1$, the enlarged copied domain is read out by utilizing magnetic Kerr effect.

Figure 1E:
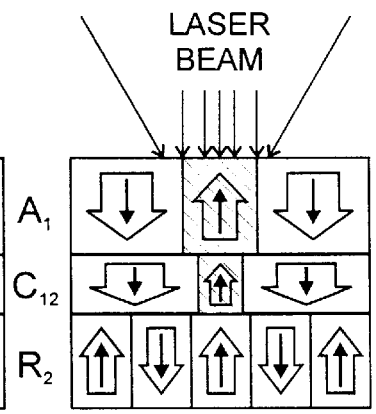
Figure 1F:
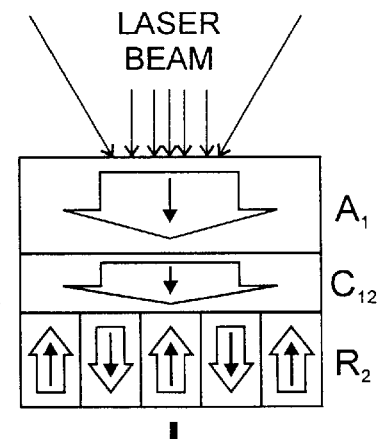

FIGS. 1E and 1F: Shrinkage and disappearance of copied magnetic domain

After reading out the copied magnetic domain in the amplification layer $A_1$ by utilizing magnetic Kerr effect, an erase magnetic field $H_E$ whose magnetization direction is opposite to the reproduction magnetic field is applied. By applying the erase magnetic field $H_E$ whose magnetization direction is opposite to the copied magnetic domain, the copied magnetic domain shrinks as shown in FIG. 1E and disappears as shown in FIG. 1F, and the magnetization direction of the region which had been the copied magnetic domain then restores its original magnetization direction the same as the surrounding region, namely, the magnetization direction of the initialization magnetic field $H_I$. As a consequence, the magnetization state of the magnetic layers returns to the state as shown the FIG. 1B.

The case of the magnetic domain whose magnetizing direction is opposite to the reproduction magnetic field Next, of the magnetic domains recorded in the recording layer $R_2$, reproduction of the magnetic domain having the magnetization direction opposite to the magnetization direction of the reproduction magnetic field, that is, reproduction of the magnetic domain having the magnetization direction in the downward direction in FIGS. 1A to 1F are explained.

In this case, the magnetic domain of the recording layer $R_2$ is also copied to the amplification layer $A_1$. The magnetization direction of the copied magnetic domain formed, however, is the same as the initialization magnetic field, and the magnetization state of the amplification layer $A_1$ is not changed, and the same magnetization state is maintained throughout the process of the reproduction. In this state, the magnetization direction of the amplification layer $A_1$ is read out by the magnetic Kerr effect. In the reproduction process of this magnetic domain, it is necessary that the magnetization direction of the copied domain is not reversed throughout the process.

Reproduction condition (Constitution I)

In order to accomplish the reproduction in the process as described above, it is necessary that the magnetic domain is copied to the amplification layer $A_1$ while the recording layer $R_2$ remains unaffected at the temperature of the magnetic lamination when it is irradiated with the laser beam in the reproduction. For this, the Curie temperature of the amplification layer $A_1$ ($Tc_{A1}$) is preferably lower than the Curie temperature of the recording layer $R_2$ ($Tc_{R2}$), and $Tc_{A1}$ should be higher than the room temperature. This is common to the Constitutions II and III as described below.

In constitution I, the Curie temperature of the amplification layer $A_1$ ($Tc_{A1}$) and the Curie temperature of the exchange coupling control layer $C_{12}$ ($Tc_{C12}$) is such that:

$$Tc_{A1} < Tc_{C12}$$

By providing the exchange coupling control layer $C_{12}$ of such properties, enlargement of the copied magnetic domain in the amplification layer $A_1$ is markedly facilitated.

Copying condition I

In order to enable sufficient copying of the magnetic domain from the recording layer $R_2$ to the amplification layer $A_1$, the magnetic laminate should satisfy the relation:

$$Hw_{A1R2} + Hr > Hc_{A1} - Hd_{A1} \qquad \text{(I-1)}$$

when the amplification layer $A_1$ has a coercive force $Hc_{A1}$ and a demagnetizing field $Hd_{A1}$, and the magnetic field of interface wall exchange coupling force between the amplification layer $A_1$ and the recording layer $R_2$ is $Hw_{A1R2}$, and the copying is accomplished by the reproduction magnetic field at an intensity of $Hr$.

The reproduction magnetic field generally fluctuates in a sinusoidal curve with lapse of time, and the value $Hr$ is not necessarily the same value in the various phases described in the present invention.

The magnetic field of interface wall exchange coupling force, for example, in the case of $Hw_{A1R2}$ is:

$$Hw_{A1R2} = sw_{A1R2}/2Ms_{A1}t_{A1}$$

wherein $sW_{A1R2}$ (also referred to as $sW_{R2A1}$) is the interface wall exchange coupling force between the amplification layer $A_1$ and the adjacent recording layer $R_2$; $Ms_{A1}$ is the saturation magnetization of the amplification layer $A_1$; and $t_{A1}$ is the thickness of the amplification layer $A_1$. The exchange coupling control layer $C_{12}$ functions as the magnetic domain wall and controls the $sW_{A1R2}$.

The condition represented by the relation (I-1) should be satisfied whether the magnetizing direction of the magnetic domain is the same as the reproducing magnetic field or opposite to the reproducing magnetic field.

Non-reversal condition I

When the magnetizing direction of the copied magnetic domain in the amplification layer $A_1$ is opposite to the reproducing magnetic field, it is necessary that the magnetizing direction of the copied magnetic domain is not reversed by the application of the reproducing magnetic field. When the reproducing magnetic field has an intensity of $Hr$, such condition (non-reversal condition) may be represented by the relation:

$$Hr < Hw_{A1R2} + Hc_{A1} - Hd_{A1} \qquad \text{(I-2)}$$

Enlargement condition I

When the magnetizing direction of the copied magnetic domain in the amplification layer $A_1$ is the same as the reproducing magnetic field, the copied magnetic domain should be enlarged by applying the reproducing magnetic field. When the magnetic field of Bloch wall exchange coupling force of the amplification $A_1$ is $Hw_{A1}$, the condition (enlargement condition) for enabling the enlargement of the copied magnetic domain in the amplification layer $A_1$ may be represented by the relation:

$$Hr > Hw_{A1R2} - Hd_{A1} + Hw_{A1} \qquad \text{(I-3)}$$

Disappearance condition I

The copied magnetic domain in the amplification layer $A_1$ should disappear before the reproduction of the adjacent magnetic domain in the in-plane direction. When the magnetizing direction of the copied magnetic domain in the amplification layer $A_1$ is the same as the reproducing magnetic field, the condition (disappearance condition) for enabling the disappearance of the copied magnetic domain in the presence of the erase magnetic field $H_E$ at an intensity of $He$ may be represented by the relation:

$$He > Hw_{A1R2} - Hd_{A1} + Hw_{A1} \qquad \text{(I-4)}$$

Non-copying condition I

The condition (non-copying condition) required to prevent the re-copying of the magnetic domain of the recording layer $R_2$ to the amplification layer $A_1$ after the disappearance of the copied magnetic domain in the amplification layer $A_1$ may be represented by the relation:

$$Hw_{A1R2} < Hc_{A1} - Hd_{A1} + He \qquad \text{(I-5)}$$

Condition of amplification layer $A_1$

In order to realize the enlargement condition and the non-reversal condition as described above at the same temperature in the amplification layer $A_1$, it is necessary to simultaneously satisfy the following relations:

$$Hr < Hw_{A1R2} + Hc_{A1} - Hd_{A1} \qquad \text{(I-2), and}$$

$$Hr > Hw_{A1R2} - Hd_{A1} + Hw_{A1} \qquad \text{(I-3).}$$

In other words, the relation:

$$Hc_{A1} > Hw_{A1} \qquad \text{(I-6)}$$

should be met at the temperature of the enlargement of the copied magnetic domain of the amplification layer $A_1$.

Constitution II

The magneto-optical recording medium of constitution II has a constitution similar to the constitution I except that a switching layer $S_{12}$ is provided instead of the exchange coupling control layer $C_{12}$. The switching layer $S_{12}$ is a magnetic layer which has a Curie temperature $Tc_{S12}$ higher than the room temperature and lower than the Curie temperature $TC_{A1}$ of the amplification layer $A_1$.

Next, the reproduction process and the conditions required for the reproduction in the constitution II are described.

Reproducing step (Constitution II)

The case of the magnetic domain whose magnetizing direction is the same as the reproduction magnetic field First, of the magnetic domains recorded in the recording layer $R_2$, reproduction of the magnetic domain having the magnetization direction which is the same as the magnetization direction of the reproduction magnetic field, that is, reproduction of the magnetic domain having the magnetization direction shown by blank arrow in the upward direction in FIGS. 2A to 2F are explained.

FIG. 2A: As-recorded state

The as-recorded state of the magnetic laminate is similar to the one shown in FIG. 1A except that magnetic domains having the magnetization direction the same as the recording layer $R_2$ is formed in the switching layer $S_{12}$ by the interface wall exchange coupling force.

FIG. 2B: Initialization

The state of the magnetic laminate is similar to the one shown in FIG. 1B except that the switching layer $S_{12}$ is magnetized by the initialization magnetic field $H_I$ in the direction the same as the initialization magnetic field.

FIG. 2C: Copying of the magnetic domain

After the application of the initialization magnetic field, the medium is irradiated with a laser beam simultaneously with the application of the reproduction magnetic field $H_R$ as in the case of FIG. 1C.

Temperature of the magnetic layers is elevated by the irradiation of the laser beam, and the interface wall exchange coupling force between the recording layer $R_2$ and the switching layer $S_{12}$, and the interface wall exchange coupling force between the switching layer $S_{12}$ and the amplification layer $A_1$ are increased. The recorded magnetic domain of the recording layer $R_2$ is thereby copied to the switching layer $S_{12}$ and to the amplification layer $A_1$ and to form copied magnetic domains in these magnetic layers. The magnetization direction of the copied magnetic domains formed in these magnetic layers is opposite to the direction of the initialization magnetization direction.

FIG. 2D: Enlargement of copied magnetic domain

The enlargement of the copied magnetic domain is accomplished as in the case of FIG. 1D in that the enlargement of the magnetic domain in the recording layer $R_2$ is avoided while the enlargement of the magnetic domain in the amplification layer $A_1$ is promoted.

The Curie temperature of the switching layer $S_{12}$ is preferably higher than the temperature at which the magnetic domain is copied, and lower than the temperature at which the force of magnetic domain enlargement is generated in the amplification layer $A_1$. The magnetic domain is copied as the temperature elevates by the irradiation of the laser beam, and the copied magnetic domain in the amplification layer $A_1$ enlarges by the further elevation in the temperature. If the Curie temperature of the switching layer $S_{12}$ is selected such that the magnetization of the switching layer $S_{12}$ has already disappeared before the copying and enlargement of the magnetic domain, the amplification layer $A_1$ is not affected by the exchange coupling force between the amplification layer $A_1$ and the recording layer $R_2$, and the enlargement of the copied magnetic domain is facilitated.

After such enlargement of the copied domain in the amplification layer A1, the enlarged copied domain is read out by utilizing magnetic Kerr effect.

FIGS. 2E and 2F: Shrinkage and disappearance of copied magnetic domain

After reading out the copied magnetic domain in the amplification layer $A_1$ by utilizing magnetic Kerr effect, an erase magnetic field $H_E$ is applied as in the case of the Constitution I. By the application of the erase magnetic field $H_E$, the copied magnetic domain in the amplification layer $A_1$ shrinks by the Bloch wall exchange coupling force and disappears, and the magnetization direction of the region which had been the copied magnetic domain then restores its original magnetization direction the same as the surrounding region, namely, the magnetization direction of the initialization magnetic field $H_I$. As a consequence, the magnetization state of the magnetic layers returns to the state as shown the FIG. 2B.

The case of the magnetic domain whose magnetizing direction is opposite to the reproduction magnetic field Next, of the magnetic domains recorded in the recording layer $R_2$, reproduction of the magnetic domain having the magnetization direction opposite to the magnetization direction of the reproduction magnetic field, that is, reproduction of the magnetic domain having the magnetization direction shown by the arrow in the downward direction in FIGS. 2A to 2F are explained.

In this case, the magnetic domain of the recording layer $R_2$ is also copied to the switching layer $S_{12}$ and the amplification layer $A_1$. The magnetization direction of the copied magnetic domain formed, however, is the same as the initialization magnetic field, and the magnetization state of the amplification layer $A_1$ is not changed, and the same magnetization state is maintained throughout the process of the reproduction. In this state, the magnetization direction of the amplification layer $A_1$ is read out by the magnetic Kerr effect. In the reproduction process of this magnetic domain, it is necessary that the magnetization direction of the copied domain is not reversed throughout the process.

Reproduction condition (Constitution II)
Copying condition II

In order to enable sufficient copying of the magnetic domain from the recording layer $R_2$ to the Switching layer $S_{12}$, the magnetic laminate should satisfy the relation:

$$Hw_{S12R2} + Hr > Hc_{S12} - Hd_{S12} \qquad \text{(II-1-1)}$$

when the amplification layer $A_1$ has a coercive force $Hc_{A1}$ and a demagnetizing field $Hd_{A1}$; the switching layer $S_{12}$ has a coercive force $Hc_{S12}$ and a demagnetizing field $Hd_{S12}$; the magnetic field of interface wall exchange coupling force between the switching layer $S_{12}$ and the recording layer $R_2$ is $Hw_{S12R2}$; and the magnetic field of interface wall exchange coupling force between the amplification layer $A_1$ and the switching layer $S_{12}$ is $Hw_{A1S12}$; and the copying is accomplished by the reproduction magnetic field at an intensity of Hr. In order to enable sufficient copying of the magnetic domain from the switching layer $S_{12}$ to the amplification layer $A_1$, the magnetic laminate should satisfy the relation:

$$Hw_{A1S12} + Hr > Hc_{A1} - Hd_{A1} \qquad \text{(II-1-2)}$$

It should be noted that the conditions represented by the relations (II-1-1) and (II-1-2) should be likewise satisfied whether the magnetization direction is the same as or opposite to the reproducing magnetic field.

Non-reversal condition II

When the magnetizing direction of the copied magnetic domain is opposite to the reproducing magnetic field, it is necessary that the magnetizing direction of the copied magnetic domain is not reversed by the application of the reproducing magnetic field. When the reproducing magnetic force has an intensity of Hr, such condition (non-reversal condition) for the switching layer $S_{12}$ may be represented by the relation:

$$Hr < Hw_{S12R2} + Hc_{S12} - Hd_{S12} \qquad \text{(II-2-1), and}$$

such condition (non-reversal condition) for the amplification layer $A_1$ may be represented by the relation:

$$Hr < Hw_{A1S12} + Hc_{A1} - Hd_{A1} \qquad \text{(II-2-2).}$$

It should be noted that, since the temperature of the magnetic layers is higher than the Curie temperature of the switching layer $S_{12}$ during the enlargement of the copied magnetic domain and the relation (II-2-1) is meaningless; and since $Hw_{A1S12}$ is zero, the relation (II-2-2) is such that:

$$Hr < Hc_{A1} - Hd_{A1} \qquad \text{(II-2-2').}$$

Enlargement condition II

When the magnetizing direction of the copied magnetic domain is the same as the reproducing magnetic field, the copied magnetic domain of the amplification layer $A_1$ should be enlarged by applying the reproducing magnetic field. When the magnetic field of Bloch wall exchange coupling force of the amplification $A_1$ is $Hw_{A1}$, the condition (enlargement condition) for enabling the enlargement of the copied magnetic domain in the amplification layer $A_1$ may be represented by the relation:

$$Hr > Hw_{A1} - Hd_{A1} \qquad \text{(II-3)}$$

Disappearance condition II

The copied magnetic domain in the amplification layer $A_1$ should disappear before the reproduction of the adjacent magnetic domain in the in-plane direction. When the magnetizing direction of the copied magnetic domain in the amplification layer $A_1$ is the same as the reproducing magnetic field, the condition (disappearance condition) for enabling the disappearance of the copied magnetic domain of the amplification layer $A_1$ in the presence of the erase magnetic field $H_E$ at an intensity of He may be represented by the relation:

$$He > Hw_{A1S12} - Hw_{A1} - Hd_{A1} \qquad \text{(II-4)}$$

Non-copying condition II

The condition (non-copying condition) required to prevent the re-copying of the magnetic domain of the recording layer $R_2$ to the switching layer $S_{12}$ when the temperature of the switching layer $S_{12}$ has reduced to a temperature below the Curie temperature may be represented by the relation:

$$Hw_{S12R2} < Hc_{S12} - Hd_{S12} + He \qquad \text{(II-5)}$$

Condition of amplification layer A

In order to realize the enlargement condition and the non-reversal condition as described above at the same temperature in the amplification layer $A_1$, it is necessary to simultaneously satisfy the following relations:

$$Hr < Hc_{A1} - Hd_{A1} \qquad \text{(II-2-2'), and}$$

$$Hr > Hw_{A1} - Hd_{A1} \qquad \text{(II-3).}$$

In other words, the relation:

$$Hc_{A1} > Hw_{A1} \qquad \text{(II-6)}$$

should be met at the temperature of the enlargement of the copied magnetic domain of the amplification layer $A_1$.

Constitution III

The magneto-optical recording medium of constitution III has a constitution similar to the constitution I except that it has no exchange coupling control layer $C_{12}$. In other words, the amplification layer $A_1$ does not have a compensation temperature higher the room temperature.

Enlargement of the copied magnetic domain in the amplification layer $A_1$ can be facilitated as long as the exchange coupling force between the amplification layer $A_1$ and the recording layer $R_2$ increases and decreases during the copying and enlargement of the magnetic domain even if no exchange coupling control layer $C_{12}$ were provided.

Constitution of the magnetic layers

Next the constitution of the magnetic layers is described in detail. The non-limited composition, thickness and the like of the magnet layers may be selected to satisfy the relations as described above. The magnetic layers, however, may preferably be constituted as described below.

Amplification layer $A_1$

The amplification layer contains a rare earth metal element and a transition metal element as its main components. The rare earth metal element used may preferably comprise at least Gd and/or Dy, and the transition metal element used may preferably comprise at least Fe and/or Co. The thickness is preferably in the range of from 10 to 100 nm. When the amplification layer is too thin, information stored in other magnetic layer is also read out through the amplification layer to result in the reduced C/N. When the amplification layer is too thick, the magnetic field of interface wall exchange coupling force can not be increased for the amplification layer, resulting in the insufficient copying of the magnetic field. The Curie temperature is preferably in the range of 80 to 300° C.

Recording layer $R_2$

The recording layer contains a rare earth metal element and a transition metal element as its main components. The rare earth metal element used may preferably comprise at least Tb, and the transition metal element used may preferably comprise at least Fe and Co. The thickness is preferably at least 10 nm. When the recording layer is too thin, the recorded magnetic domain is unstable and recording is substantially impossible. No particular upper limit is present for the thickness of the recording layer, and a thickness in excess of 100 nm will only invite the increased cost. The Curie temperature is preferably in the range of 80 to 400° C.

Exchange coupling control layer $C_{12}$

The exchange coupling control layer contains a rare earth metal element and a transition metal element as its main components. The rare earth metal element used may preferably comprise at least Gd and/or Dy, and the transition metal element used may preferably comprise at least Fe and/or Co. The thickness is preferably in the range of from 5 to 50 nm. When the exchange coupling control layer is too thin, the control of the exchange coupling force as described above will be insufficient. When the exchange coupling control layer is too thick, the exchange coupling control layer $C_{12}$ as a whole can not play the role of the domain wall, and the control of the exchange coupling force as described above is not realized. The Curie temperature is preferably at least 80° C.

Switching layer $S_{12}$

The switching layer contains a rare earth metal element and a transition metal element as its main components. The rare earth metal element used may preferably comprise at least Gd and/or Dy, and the transition metal element used may preferably comprise at least Fe and/or Co. The thickness is preferably in the range of from 5 to 50 nm. When the switching layer is too thin, blockage of the exchange coupling force will be difficult. When the switching layer is too thick, magnetic field of the interface wall exchange coupling force will be reduced and copying of the magnetic domain will be insufficient. The Curie temperature is preferably in the range of 80 to 300° C.

Enhancing layer $E_{01}$

The enhancing layer is a magnetic layer of the magnetic laminate optionally provided on the side nearest to the substrate, namely, between the amplification layer $A_1$ and the substrate. The enhancing layer functions to enhance the Kerr effect. When the enhancing layer $E_{01}$ has a Curie temperature of $Tc_{E01}$, and the amplification layer $A_1$ has a Curie temperature of $Tc_{A1}$, the enhancement of the Kerr effect is attained when the relation is such that:

$$Tc_{A1} < Tc_{E01}$$

When this relation is not satisfied, Kerr effect is not enhanced. The Curie temperature is preferably at least 300° C.

The enhancing layer contains a rare earth metal element and a transition metal element as its main components. The rare earth metal element used may preferably comprise at least Gd, and the transition metal element used may preferably comprise at least Fe and Co. The thickness is preferably in the range of from 5 to 50 nm. When the enhancing layer is too thin, blockage of the exchange coupling force will be difficult. When the enhancing layer is too thick, the properties of the amplification layer will be influenced, and the reproduction along the scheme as described above will be difficult.

Dielectric layer

In the magneto-optical recording medium of the constitution as described above, a first dielectric layer is generally formed between the substrate and the magnetic laminate, and a second dielectric layer is formed on the front side of the magnetic laminate. Such dielectric layers protect the magnetic laminate, and also, enhances the Kerr effect and the Faraday effect. The dielectric layer may be fabricated from a metal oxide, a metal nitride, a metal sulfate, or a mixture of such metal compounds. The first dielectric layer is generally deposited to a thickness of from about 30 to 300 nm, and the second dielectric layer is generally deposited to a thickness of from about 10 to 100 nm.

Reflective layer

On the front surface of the second dielectric layer is optionally formed a reflective layer, which also functions as a heat release layer. The reflective layer is generally formed to a thickness of from 10 to 200 nm.

Protective layer

A resin protective layer is formed to a thickness of from about 1 to 100 $\mu$m, generally as a top layer of the medium.

Substrate

In the magneto-optical recording medium used with the method of the present invention, the reproducing light is directed from rear side of the substrate, and the substrate should be substantially transparent to the reproducing light. The substrate, therefore, should be constituted from a material such as a resin or a glass.

EXAMPLES

Examples of the present invention are given below by way of illustration and not by way of limitation.

Example

A sample of magneto-optical recording disc was prepared as described below by using a polycarbonate disc having an outer diameter of 120 mm and a thickness of 1.2 mm (track pitch 1.1 $\mu$m).

First dielectric layer

A first dielectric layer of 60 nm was formed by depositing a silicon nitride film by sputtering of a silicon target while passing argon gas and nitrogen gas through the chamber.

Amplification layer $A_1$

An amplification layer of 35 nm was formed by sputtering of a Gd—Fe—Co alloy target in argon atmosphere.

Exchange coupling control layer $C_{12}$

A exchange coupling control layer of 25 nm was formed by sputtering of a Gd—Fe—Co alloy target in argon atmosphere.

Recording layer $R_2$

A recording layer of 40 nm was formed by sputtering of a Tb—Fe—Co alloy target in argon atmosphere.

Second dielectric layer

A second dielectric layer of 40 nm was formed by depositing a silicon nitride film by sputtering of a silicon target while passing argon gas and nitrogen gas through the chamber.

Resin protective layer

Resin protective layer of about 5 $\mu$m was formed by spin coating a UV curable resin and curing the coated resin by UV irradiation.

Evaluation of Properties

The thus prepared sample was recorded and reproduced in an optical disc evaluator under the conditions as described below.

Recording conditions

Wavelength of laser: 680 nm

Numerical aperture, NA: 0.55

Recording power: 10 mW

Recording magnetic field: 200 Oe (11.4 MHz)
Linear velocity: 14.8 m/s
Re-roducing conditions
  Wavelength of laser: 680 nm
  Numerical aperture, NA: 0.55
  Reproducing power: 2.0 mW
  Initialization magnetic field: 500 Oe
  Reproducing/erasing magnetic field: 200 Oe (11.4 MHz)
  Linear velocity: 7.4 m/s
The data transmission rate in the recording was as high as 22.8 Mbps, and the C/N was as high as 47 dB.

Comparative Example

The sample prepared in the Example was recorded and reproduced by repeating the procedure of the Example as described above except that the linear velocity in the recording was reduced to ½ (7.4 m/s), the frequency of the recording magnetic field was reduced to ½ (5.7 MHz), and the recording power was changed to 8 mW. The data transmission rate in the recording was half of the Example, namely, 11.4 Mbps.

The results demonstrate advantageous merits of the present invention.

JP-A 8-7350 and Japanese Patent Application No. 9-108089 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A recording/reproducing method for a magneto-optical recording medium having a magnetic lamination comprising a recording layer and an amplification layer, wherein upon recording, the recording medium is irradiated with a laser beam of constant intensity to apply a modulated recording magnetic field to the recording layer to thereby form recorded magnetic domain in the recording layer; and upon reproduction, the recording medium is first irradiated with a laser beam simultaneously with application of a modulated reproduction magnetic field to copy the recorded magnetic domain to the amplification layer to thereby form copied magnetic domain and enlarge the thus formed copied magnetic domain, and the copied magnetic domain is then read out, and an erase magnetic field of the direction opposite to said reproduction magnetic field is subsequently applied to the copied magnetic domain to thereby promote shrinkage and disappearance of said copied magnetic domain; and the recording and the reproduction are conducted such that:

$$V_R/V_P > 1$$

wherein $V_R$ is linear velocity of the magneto-optical recording medium in relation to said recording magnetic field, and $V_P$ is linear velocity of the magneto-optical recording medium in relation to modulated magnetic field comprising said reproduction magnetic field and erase magnetic field.

2. A recording/reproducing method of a magneto-optical recording medium according to claim 1 wherein the recording and the reproduction are conducted such that:

$$V_R/V_P < 2.$$

* * * * *

UNITED STATES PATENT AND TRADEMARK OFFICE
CERTIFICATE OF CORRECTION

PATENT NO. : 5,963,512
DATED : 5 October 99
INVENTOR(S) : Hiroyasu INOUE ET AL.

It is certified that error appears in the above-identified patent and that said Letters Patent are hereby corrected as shown below:

In claim 2, column 16, line 35 should read:

$$V_R/V_P \leq 2.$$

Signed and Sealed this

Fourth Day of April, 2000

Attest:

Q. TODD DICKINSON

Attesting Officer

Director of Patents and Trademarks